United States Patent
Michalak

(10) Patent No.: US 10,116,911 B2
(45) Date of Patent: Oct. 30, 2018

(54) REALISTIC POINT OF VIEW VIDEO METHOD AND APPARATUS

(71) Applicant: Qualcomm Incorporated, San Diego, CA (US)

(72) Inventor: Gerald Paul Michalak, Clary, NC (US)

(73) Assignee: QUALCOMM Incorporated, San Diego, CA (US)

(*) Notice: Subject to any disclaimer, the term of this patent is extended or adjusted under 35 U.S.C. 154(b) by 494 days.

(21) Appl. No.: 13/718,957

(22) Filed: Dec. 18, 2012

(65) Prior Publication Data

US 2014/0168359 A1 Jun. 19, 2014

(51) Int. Cl.
H04N 13/00 (2018.01)

(52) U.S. Cl.
CPC ......... *H04N 13/00* (2013.01); *H04N 13/0014* (2013.01); *H04N 13/0066* (2013.01)

(58) Field of Classification Search
CPC ........... H04N 13/0278; H04N 13/0014; H04N 13/00; H04N 13/0066
USPC ............................................ 348/E13.023, 42
See application file for complete search history.

(56) References Cited

U.S. PATENT DOCUMENTS

| | | | | |
|---|---|---|---|---|
| 5,495,576 A | * | 2/1996 | Ritchey | G06T 17/00 345/420 |
| 5,729,471 A | * | 3/1998 | Jain | H04N 13/139 725/131 |
| 7,705,876 B2 | * | 4/2010 | Starkweather | H04N 13/371 348/51 |
| 2008/0178232 A1 | * | 7/2008 | Velusamy | H04N 5/23203 725/88 |
| 2009/0051699 A1 | * | 2/2009 | Posa | H04N 13/0468 345/619 |
| 2010/0053310 A1 | * | 3/2010 | Maxson | H04N 13/194 348/51 |
| 2010/0225735 A1 | * | 9/2010 | Shaffer | G06F 3/012 348/14.08 |

(Continued)

FOREIGN PATENT DOCUMENTS

| CN | 101472190 A | 7/2009 |
|---|---|---|
| CN | 102342100 A | 2/2012 |

(Continued)

OTHER PUBLICATIONS

International Search Report and Written Opinion—PCT/US2013/071304—ISA/EPO—dated Feb. 17, 2014.

*Primary Examiner* — Deirdre L Beasley
(74) *Attorney, Agent, or Firm* — Knobbe, Martens, Olson & Bear, LLP

(57) ABSTRACT

Method and apparatus for obtaining and providing realistic point of view video are described. In one innovative aspect, a device for providing video is provided. The system includes a view capture circuit configured to obtain multiple views of a scene, each view having a capture position. The system includes a receiver configured to receive a request for the scene, the request including a viewing position. The system includes a view selector configured to identify one or more views of the scene based on a comparison of the viewing position and the capture position of each view. The system includes a view generator configured to generate an output view based on the identified views and the viewing position.

52 Claims, 5 Drawing Sheets

(56) References Cited

U.S. PATENT DOCUMENTS

| | | | |
|---|---|---|---|
| 2010/0259595 A1* | 10/2010 | Trimeche | H04N 21/21805 348/43 |
| 2010/0260486 A1* | 10/2010 | Liu | H04N 19/597 386/341 |
| 2010/0322479 A1* | 12/2010 | Cleveland | G06F 3/012 382/103 |
| 2011/0115883 A1* | 5/2011 | Kellerman | G06F 3/012 348/46 |
| 2012/0060177 A1* | 3/2012 | Stinson, III | H04N 21/4223 725/12 |
| 2012/0062556 A1* | 3/2012 | Yamamoto | H04N 13/0022 345/419 |
| 2012/0105593 A1* | 5/2012 | Berestov | G02B 27/1066 348/49 |
| 2012/0154396 A1* | 6/2012 | Atkins | G02B 27/2214 345/419 |
| 2012/0162384 A1* | 6/2012 | Vesely | G06T 19/006 348/47 |
| 2012/0200676 A1* | 8/2012 | Huitema | H04N 13/378 348/51 |
| 2012/0229431 A1* | 9/2012 | Hiroki | G09F 19/14 345/204 |
| 2015/0222815 A1* | 8/2015 | Wang | G11B 27/031 348/36 |

FOREIGN PATENT DOCUMENTS

| | | |
|---|---|---|
| CN | 102547323 A | 7/2012 |
| CN | 102611909 A | 7/2012 |
| CN | 102695065 A | 9/2012 |
| EP | 2227021 A1 | 9/2010 |
| JP | H09200715 A | 7/1997 |
| JP | 2004514205 A | 5/2004 |
| JP | 2004193962 A | 7/2004 |
| JP | 2012094990 A | 5/2012 |
| JP | 2012142792 A | 7/2012 |
| WO | WO-0239716 A2 | 5/2002 |
| WO | 2007069189 A2 | 6/2007 |

* cited by examiner

REALISTIC POINT OF VIEW VIDEO METHOD AND APPARATUS

BACKGROUND

Field

The present invention relates to video display, more specifically to realistic point of view video display.

Background

Two dimensional and three dimensional video systems can provide a very high quality picture. However, the image is generally "stuck" on the presentation device (e.g., screen) such that as a viewer moves across their living room, for example, the same picture is presented.

Techniques have been developed to convert existing two dimensional images into three dimensional images by manipulating a single view of a scene to generate the three dimensional image. However, there are limits as to the realism that may be present in a video generated from a single view. For example, when converting a single view, the two dimensional image may be distorted in a limited fashion. At a certain point, items occluded from the original view (e.g., no pixel information is available) are required to generate a realistic image for the scene. In some systems, the amount a viewer can move and still be presented with a realistic rendering may be limited by this occlusion distance.

Therefore, there is a need for methods and apparatus to obtain and provide realistic point of view video.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include realistic point of view video.

In one innovative aspect, a method of providing realistic video is provided. The method includes obtaining multiple views of a scene, each view having a capture position. The method includes receiving a request for the scene, the request including a viewing position. The method includes identifying one or more views of the scene based on a comparison of the viewing position and the capture position of each view. The method includes generating an output view based on the identified views and the viewing position.

In another innovative aspect, a device for providing video is provided. The device includes a view capture circuit configured to obtain multiple views of a scene, each view having a capture position. The device includes a receiver configured to receive a request for the scene, the request including a viewing position. The device includes a view selector configured to identify one or more views of the scene based on a comparison of the viewing position and the capture position of each view. The device includes a view generator configured to generate an output view based on the identified views and the viewing position.

In a further innovative aspect, another device for providing realistic video is provided. The device includes means for obtaining multiple views of a scene, each view having a capture position. The device includes means for receiving a request for the scene, the request including a viewing position. The device includes means for identifying one or more views of the scene based on a comparison of the viewing position and the capture position of each view. The device includes means for generating an output view based on the identified views and the viewing position.

In one innovative aspect, a computer-readable storage medium comprising instructions executable by a processor of a device is provided. The instructions cause the device to obtain multiple views of a scene, each view having a capture position. The instructions cause the device to receive a request for the scene, the request including a viewing position. The instructions cause the device to identify one or more views of the scene based on a comparison of the viewing position and the capture position of each view. The instructions cause the device to generate an output view based on the identified views and the viewing position.

In another innovative aspect, a method of obtaining realistic video is provided. The method includes transmitting a content request including a content selection and a viewing position. The method includes receiving one or more views of the requested content. The method includes generating an output view based on the received views and the viewing position.

In a further innovative aspect, a device for obtaining realistic video is provided. The device includes a transmitter configured to transmit a content request including a content selection and a viewing position. The device includes a receiver configured to receive one or more views of the requested content. The device includes a view generator configured to generate an output view based on the received views and the viewing position.

In one innovative aspect, another device for obtaining realistic video is provided. The device includes means for transmitting a content request including a content selection and a viewing position. The device includes means for receiving one or more views of the requested content. The device includes means for generating an output view based on the received views and the viewing position.

In yet another innovative aspect, a computer-readable storage medium comprising instructions executable by a processor of a device is provided. The instructions cause the device to transmit a content request including a content selection and a viewing position. The instructions cause the device to receive one or more views of the requested content. The instructions cause the device to generate an output view based on the received views and the viewing position.

These and other implementations incorporating one or more innovative aspects are further described below with reference to the following figures.

Figure 1:
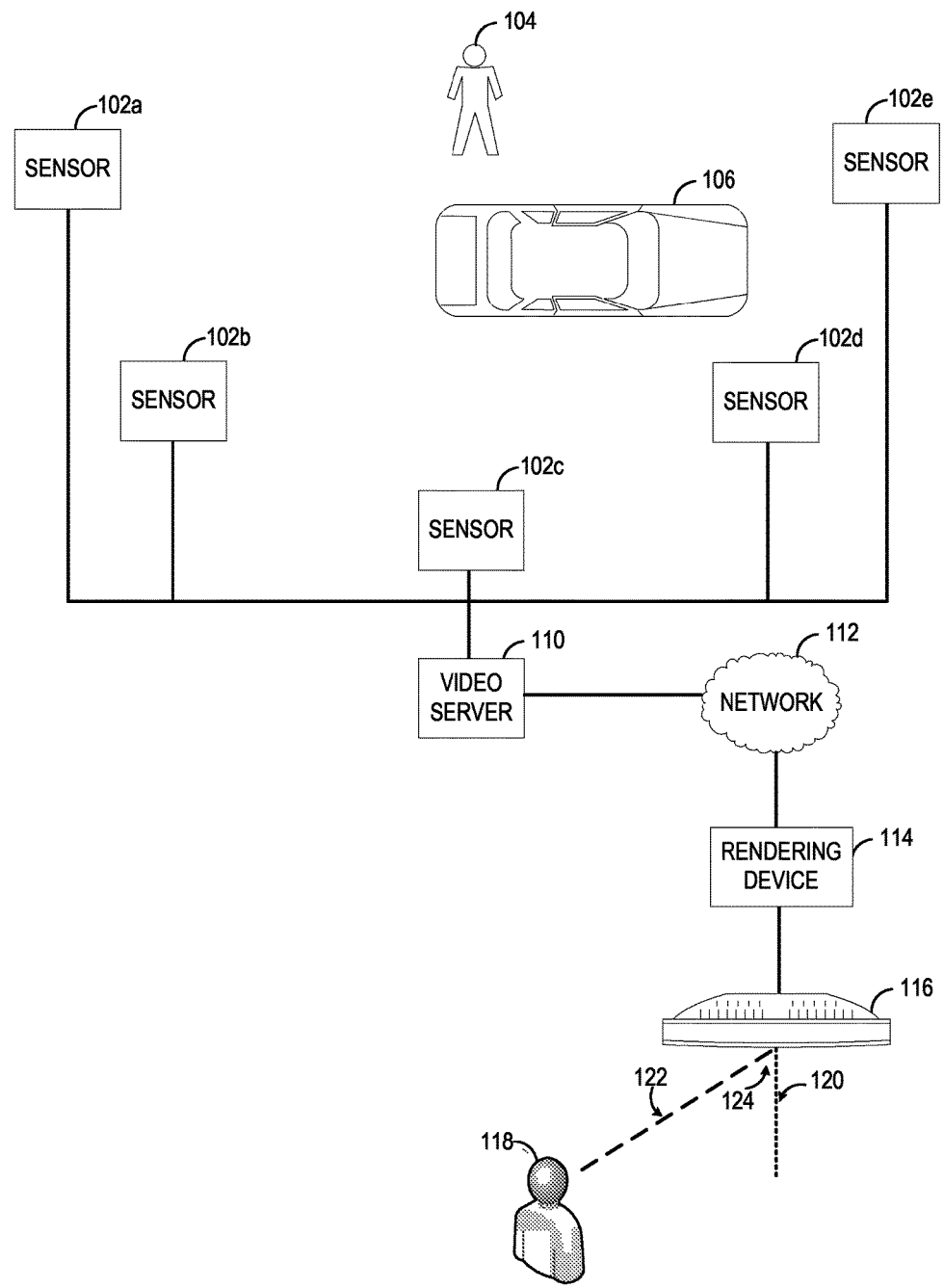
FIG. 1 illustrates a functional block diagram of an exemplary realistic point of view video system.

In the figures, to the extent possible, elements having the same or similar functions have the same designations.

DETAILED DESCRIPTION

The detailed description that follows provides several devices and methods for providing realistic point of view video. Realistic is generally used to describe the characteristics of the video presentation which make visual appearance of the scene more life-like than a flat video presentation. Realism may be associated with how the lighting of a scene looks (e.g., reflection and shadows), how much depth the scene has, how the image interacts with the viewer as the viewer moves about the viewing area, and the like.

The described devices and methods allow a viewer to move through a viewing area and as the viewer moves, the video presentation is changed to reflect the new point of view. Consider viewing a scene featuring an actor standing behind a car. As a viewer moves to the left, the actor's legs, which were otherwise obstructed by the car when viewed from a "dead center" view of the scene, come into view. Consider also, as the viewer moves closer to the screen to examine the car, the picture zooms in to provide a closer look. Such interactive viewing enhances the overall viewing experience and provides new opportunities for video content creators and providers.

One non-limiting advantage of the described processes includes the selecting and obtaining of a single view based on one or more viewing positions for a viewer. Another non-limiting advantage of the described processes includes dynamic adjustment of the position based video as a viewer moves through the viewing space. It will be appreciated that for a selected video, the viewer may move in three dimensions during presentation of the selected video. As such, the processes and apparatus described afford reliable, efficient, and realistic presentation of the selected video according to the changing viewer position.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

FIG. 1 illustrates a functional block diagram of an exemplary realistic point of view video system. The system shown in FIG. 1 includes several sensors, sensor 102a, sensor 102b, sensor 102c, sensor 102d, and sensor 102e (collectively hereinafter referred to as sensor 102). The sensor 102 may be a camera, a microphone, an infrared detector, or other device configured to capture information about a scene. The sensor 102 may be digital or analog. In some implementations, an analog recording may be converted to digital form directly by the sensor 102 or through post processing conversion (not shown).

Each sensor 102 is configured to capture the scene information from a capture position. A capture position may include a capture angle and a capture distance. The capture angle may identify a horizontal and/or vertical angle of the sensor 102 when the scene was captured by the sensor 102.

As shown, the five sensors are arranged in a semi-circle around the scene. The scene shown in FIG. 1 includes a person 104 and a car 106. It will be understood that the scene may include other objects and subject matter. Depending on the location of the sensor 102, the amount of the person 104 visible at the location changes. For example, the sensor 102a, the sensor 102b, and the sensor 102e may capture full views of the person 104. The sensor 102a and the sensor 102b will not be able to capture a view of the headlights of the car 106. The sensor 102c may be able to obtain a partial image of the person 102 with a portion of the person 102 being obstructed by the car 106. Similarly, the sensor 102d may capture the top of the head of the person 104 but the rest of the person 104 may be obstructed by the car 106.

Accordingly, various views of the scene will provide different details of the objects within the scene. The capture position at the time of capture is stored along with the image data. The capture position may be represented relative to the scene, relative to a configured "center" of the scene, and/or relative to other sensors used to capture the scene.

The capture position and image information may be provided to a video server 110. The capture position may be provided as an offset from a center view of the scene. In some implementations, the capture position may be provided as a relative value from the sensor to another sensor.

The capture position and image information may be transmitted electronically from the sensor 102 to the video server 110. In some implementations, the information may be stored by an intermediary such as a digital memory (e.g., DVD, CD, Blu-ray, network storage location, etc.) and later loaded onto the video server 110. In some implementations, the video server 110 may not store all the information, but rather only a portion of the information needed to identify the video, the available versions, and locator information for the version (e.g., uniform resource locator (URL)).

Via a network 112, a rendering device 114 may request video content from the video server 110. The network may include one or more of a satellite network, local area network, wide area network, cellular network, peer-to-peer network and the like. The network 112 may be a public network (e.g., the Internet), or a private network (e.g., virtual private network (VPN)). The information can be transmitted via the network 112 using appropriate and known network transmission protocols (e.g., TCP/IP).

The rendering device 114 may be implemented as a set-top-box, a console, a computing device (e.g., laptop, desktop, smartphone), or the like. The rendering device 114 is coupled with a display 116. The display 116 may be implemented as a device configured to present video images such as a liquid crystal display, a cathode ray tube display, a plasma display, a touch screen display, or a light emitting diode display. The display 116 may be configured to present the video images in two or three dimensions. In some implementations, the rendering device 114 may be integrated in the display 116.

The display 116 may be associated with a center view position 120. The center view position 120 generally refers to a position relative to the display 116 whereby the viewer is perpendicular to the display 116 and centered on the face of the display 116. For example, if the display 116 is a 20 inch square display, a point 10 inches from the left side of the display 116 and 10 inches from the top of the display 116 would correspond to the center of the face of the display 116.

A viewer 118 may not be watching the display 116 from the center view position 120. The viewer may be located at an angle offset from the center view position. The angle may be referred to as a viewing angle 124. As shown in FIG. 1, the viewing angle 124 is a two dimensional angle. It will be appreciated that the viewing angle 124 may comprise a horizontal viewing and vertical viewing angle.

The viewer 118 may also be located at a certain distance from the view. The distance may be referred to as a viewing distance 122. Using the position information of the viewer, such as the viewing angle 124 and/or the viewing distance 122, a realistic version of the scene may be provided which is realistic to the position of the viewer 118.

Figure 2:
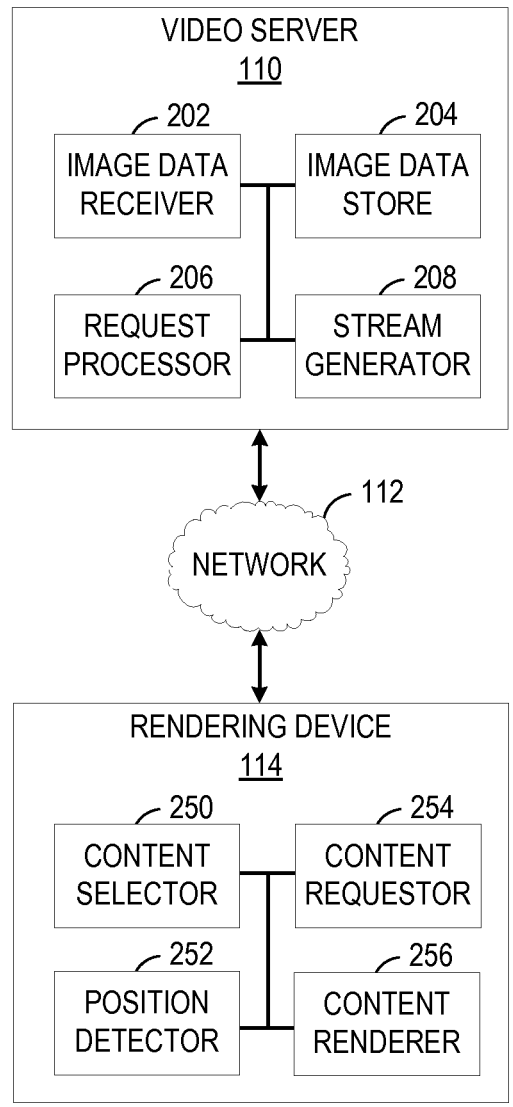
FIG. 2 illustrates a functional block diagram of an exemplary portion of a realistic point of view video system.

FIG. 2 illustrates a functional block diagram of an exemplary portion of a realistic point of view video system. The rendering device 114 includes a content selector 250. The content selector 250 is configured to receive a selection of a piece of video content for display. For example, the content selector 250 may receive a signal from a remote control indicating a particular video for presentation. In some implementations, the display 116 may receive the selection of content for display and provide this indication to the content selector 250.

The rendering device 114 shown includes a position detector 252. The position detector 252 is configured to determine the viewing positions of one or more viewers located proximate to the display 116. In one implementation, the position detector 252 may detect the location of a device such as a remote control and use this as the viewing position. In some implementations, the position detector 252 may receive a signal from a device attached or associated with the viewer such as viewing glasses or a wearable beacon. Other sensors may be included to transmit one or more signals to the position detector 252 such as a photodetector, a light source, a gyroscope, a global positioning system, or an antenna (e.g., wireless antenna).

In some implementations, the position detector 252 may determine the viewing position based on image capture of the viewing area. In such implementations, the position detector 252 may obtain calibrated distances and angles to known objects in the viewing area such as sofas, bookshelves, potted plants, exercise equipment, lighting or electrical fixtures, décor items, and the like. Based on these known objects, the position detector 252 may periodically receive an image of the viewing area and determine the location of objects relative to the known objects.

Another image detection process including facial recognition may be used to determine viewing position information. For example, upon capturing an image of the viewing area from a reference point near the display, human faces may be identified. Based on characteristics of the identified human faces included in the image such as size, shadows, location of features (e.g., eyes, nose, and forehead), the viewing distance and/or angle may be determined.

Other methods of determining the viewing position may be implemented without departing from the scope of the present disclosure.

The rendering device 114 shown also includes a content requestor 254. The content requestor 254 is configured to request the selected content. If the rendering device 114 determines that the content source is configured to handle content requests including viewing position information, the content requestor 254 may include the detected viewing position information. The position detector 252 may be configured to detect the viewing position for more than one viewer. In some implementations, the content requestor 254 may transmit all the viewing positions in the content request. In some implementations, the content requestor 254 or the position detector 252 may generate a composite viewing position for a plurality of viewers. For example, the viewing position may be an average of all detected viewing positions.

The content request may include an identifier for the selected content. The identifier may be a link (e.g., URL) to the content. The content request may include the viewing position information. The viewing position information may be included as a coordinate pair for two-dimensional positional information. The viewing position information may include three-dimensional positional information. Three-dimensional positional information may be represented in a variety of ways such as a Cartesian coordinate trio (e.g., X, Y, and Z), spherical coordinates, and/or cylindrical coordinates.

The viewing position information may also include a relative point indicating the point of reference for the provided viewing position. Examples of relative points include the center of the display, the top of the display, and the bottom of the display. In some implementations, multiple viewing positions relative to multiple reference points may be provided in the content request.

It will be appreciated that the more position information provided, the more accurately the position may be determined. Accordingly, the amount of position information included in the content request may be dynamically adjusted. The amount of position information may refer to the number of viewing position coordinates provided and/or the precision used to represent the position (e.g., number of decimal places). The adjustment may be based on the type of content (e.g., live versus recorded), network 112 resources, video server 110 resources, and rendering device 114 resources. In some implementations, the content request may be included in a file such as an XML file.

The content requestor 254 may transmit the content request via the network 112 to the video server 110.

The video server 110 may include an image data receiver 202. The image data receiver 202 is configured to receive the image data such as the video data. The image data receiver 202 may receive the actual picture information for the video. In some implementations, the image data receiver 202 may receive only pointers (e.g., URLs) to the video data. For a given video presentation, the image data receiver 202 may receiver multiple views, each view corresponding to a sensor 102. The image data receiver 202 may store the received image data in an image data store 204.

A request processor 206 may receive the content request from the content requestor 254 via the network 112. The request processor 206 is configured to determine if the selected content is included in the image data store 204. If the selected content is identified in the image data store 204, the request processor 206 may be further configured to determine if a version of the image data corresponding to the viewing position is available.

In some implementations, the image data store 204 may include a version of the selected content captured by a sensor 102 at the specified viewing position. In some implementations, the image data store 204 may not include a version from the specified viewing position. The request processor 206 may obtain a tolerance value. The tolerance value may identify a viewing position deviation value. The viewing position deviation value may indicate an acceptable difference between the specified viewing position and the viewing position of image data included in the data store 204. For example, if the tolerance value is 5 and the specified viewing angle is 79 degrees, a version of the selected content captured from 75 degrees would be deemed acceptable. Using the same tolerance value of 5 and a viewing angle of 85 degrees, the version of the selected content captured at 75 degrees would not be deemed acceptable for presentation.

The tolerance value may be configured in the video server 110. In some implementations, the tolerance value may be configured as part of the received image data. For example, certain content may be less sensitive to vertical viewing angle than horizontal viewing angles. In such implementations, the viewing position deviation tolerance for horizontal and vertical viewing angles may be associated with the image data and stored in the image data store 204.

The tolerance value may be included in the content request by, for example the content requestor 254. In one implementation, the content requestor 254 may obtain the tolerance from a user configuration stored in memory of the rendering device 114.

If image data captured at or within a threshold of the specified viewing angle is included in the image data store 204, the image data is provided to a stream generator 208 included in the video server 110. The stream generator 208 is configured to generate a stream of image data suitable for transmission via the network 112 to the rendering device 114.

In some implementations, the specified viewing position may be between the capture positions for two versions of the selected content. In such a case, the stream generator 208 may be configured to generate a single composite stream which combines the two streams to provide an image data stream at the specified viewing position. In some implementations, the generation of the composite view may be referred to as interpolation.

In some implementations, the video server 110 may be configured to provide the one or more views. The stream generator 208 may be configured to transmit the image data corresponding to the two versions of the selected content to the rendering device 114. In such implementations, the rendering device 114 may be configured to further process the received views. A content renderer 256 included in the rendering device 114 may be configured to generate the composite view from the provided streams.

The content renderer 256 may also be configured to provide the image stream corresponding to the selected content at the specified viewing position for display. In addition to generating a composite stream and providing the final output stream, the content renderer 256 may also be configured to further enhance the content before final presentation. For example, the content renderer 256 may also consider the viewing distance 122 of the viewer 118. Based on the viewing distance 122, the content renderer 256 may zoom in on a portion of the selected content.

It will be understood that the system described in FIG. 2 is a dynamic system. Accordingly, the position detector 252 may be configured to periodically determine the position of the viewer 118 and re-select content and/or viewing angles. The period for determining the viewing position may be configured by the user at the rendering device 114. The period may also be dynamically determined based on characteristics of the rendering device 114 such as processor load, battery power, network bandwidth, network connectivity type (e.g., cellular, WiFi, Ethernet), and the like.

Figure 3:
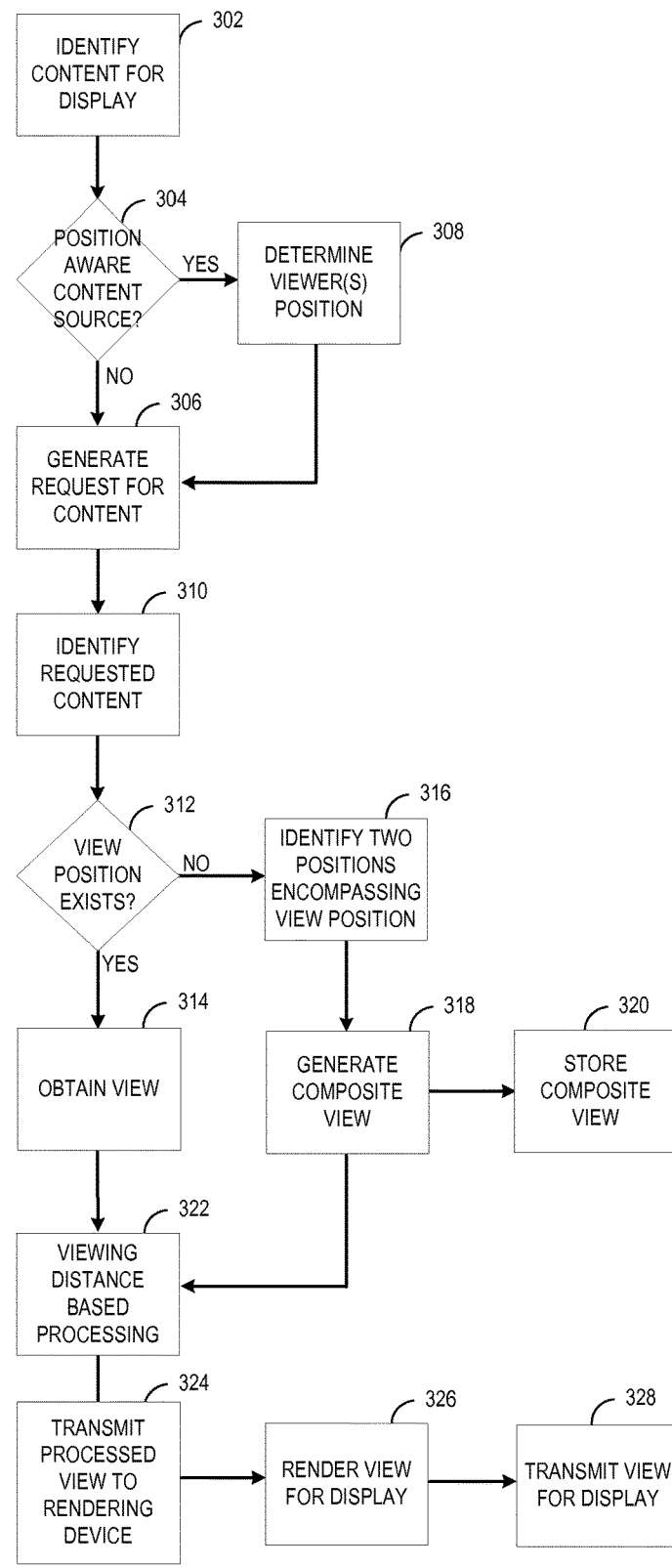
FIG. 3 illustrates a process flow diagram for an exemplary process of requesting and providing realistic point of view video.

FIG. 3 illustrates a process flow diagram for an exemplary process of providing realistic point of view video. The process shown in FIG. 3 may be implemented in/by the video server 110 and/or the rendering device 114. At node 302, content for display is identified. The identification may include receiving a selection from a remote control, an on-screen interface selection, according to a schedule, or the like.

At decision node 304, a determination is made as to whether the content source for the identified content is position aware. A content source is position aware if the content source can receive viewing position information and provide one or more image streams based in part on the viewing position information. The determination may include transmitting a request to the content source for capability information. The capability information may be stored in a memory (e.g., cached). In some implementations, the content sources may be statically defined. In such implementations, the determination may include querying the static definitions for the characteristics of the identified content source.

If the content source is not position aware, at node 306, a request for the content is generated without determining the view position. Returning to decision node 304, if the content source is a position aware content source, at node 308 the position(s) of the viewer(s) is determined as discussed above. At node 306, the request for the content is generated including the viewing position information.

At node 310, the video server 110 identifies the requested content. The identification may include querying the image data store 204 for the requested content. At decision node 312, a determination is made as to whether the requested view position exists. If no view position was requested (e.g., when the content source is not position aware), the identified view is the default view position and the process continues to node 314 as will be described. In a position aware content source, if the identified version of the content is at or within the tolerance of the requested view position, the process also continues to node 314.

At node 314, the identified view is obtained. Obtaining the identified view may include retrieving the image data for the requested content from the image data store 204. Obtaining the identified view may include retrieving location information for the image data from the image data store 204 and initiating a download of the image data.

Returning to decision node 312, if the requested view position does not exist but the content source is position aware, at node 316, two positions encompassing the requested view position are identified. For example, the requested view angle may be 75 degrees but the selected content was captured only in intervals of 10 degrees (e.g., 10, 20, 30, 40, 50, 60, 70, 80, and 90 degrees). In such an example, the versions captured at 70 and 80 degrees would encompass a requested view angle of 75 degrees.

At node 318, a composite view is generated based on the identified encompassing views. To generate the composite view, image data from a portion of the first captured view position and a portion of the second captured view position at the same point in time are identified. The identified portions are then combined to generate the composite view. The combination may include averaging the image data between the two views, performing spatial or feature detection to identify the appropriate composite image information, interpolation based on the identified views, or other processes for generating image data from multiple sources. Some implementations may include node 320. At node 320, the generated composite view may be stored in the image data store 204. Position information associated with the generated composite view may also be stored for the generated composite view. It may be desirable in some systems to store the generated composite view as an eligible version of the scene for subsequent requests. The storing of node 320 may occur during or after the remaining processing shown in FIG. 3.

At node 322, the obtained or composite view may be further processed based on viewing distance. The viewing distance processing may include zooming in or out on a portion of the content based on the viewing distance included in the content request. For example, if the viewing distance corresponds to the distance of the capture device to the scene, no processing may be performed at node 322. If the viewing distance corresponds to less than the distance of the capture device to the scene, at node 322, the content may be zoomed in thereby excluding a peripheral portion of the view and enlarging the remaining portion of the view. Zooming in may include one or more of scaling and cropping of the view. The view distance based processing may be configurably enabled such as by a configuration value stored in the video server 110 or included in the content request.

The processing may be similarly configured to limit the amount of zooming for the device or for a particular content selection. For example, the video server 110 may include a minimum and maximum zoom. If the view distance included in the content request is less than the minimum zoom, no zoom processing is performed. If the view distance in the content request is greater than the maximum zoom, the processing may perform zooming up to the maximum rather than according to the identified view distance.

At node 324, a view which includes content selected and processed based on the content request is transmitted to the rendering device 114. The transmission may be a single stream of the view. In some implementations, the view may be divided into smaller data packets. In such implementations, the transmission may include sending all or a portion of the packets. The transmission may be wired or wireless as discussed above.

At node 326, the view is rendered for display. The rendering may include additional color correction, formatting, scaling, and the like to allow the view to be displayed on the target display.

At node 328, the rendered view is transmitted to the display 116 for presentation. The transmission may be a single stream of the view. In some implementations, the view may be divided into smaller data packets. In such implementations, the transmission may include sending all or a portion of the packets. The transmission may be wired or wireless as discussed above. In some implementations, the rendered view may be stored in a memory accessible by the display 116. At the time of presentation, the rendered view is retrieved from the memory by the display 116 for presentation.

The process described in FIG. 3 includes generating the composite view at the video server 110. In some implementations, the generation of the composite view may be performed by the rendering device 114 as described above. Similarly, the viewing distance based processing was described in FIG. 3 as occurring at the video server 110. In some implementations, it may be desirable to perform the viewing distance based processing at the rendering device 114 as described above.

Figure 4:
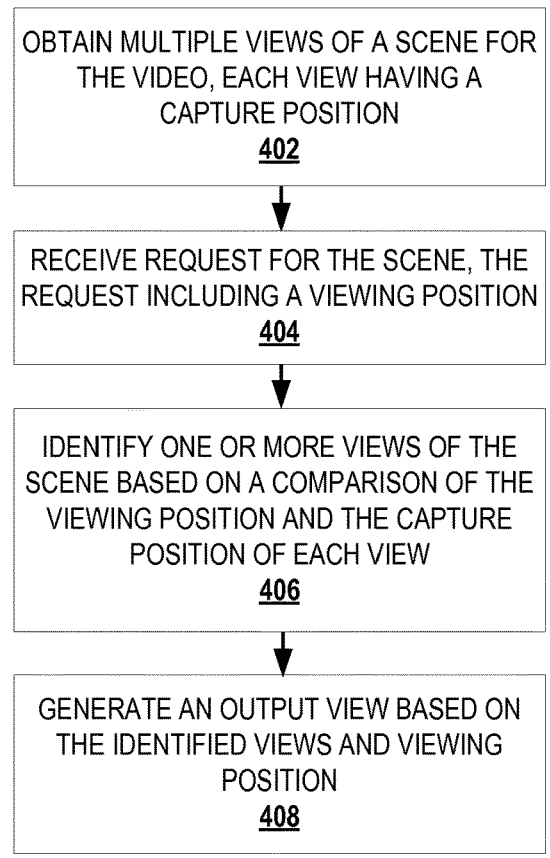
FIG. 4 illustrates a process flow diagram for an exemplary process of providing realistic video.

FIG. 4 illustrates a process flow diagram for an exemplary process of providing realistic video. The process may be implemented in whole or in part by the devices described herein. For example, the process may be implemented by/in a video server 110 or the device shown in FIG. 5 below.

At node 402, multiple views of a scene for the video are obtained. Each view includes a capture position. The capture position, as discussed above, includes information identifying the location of the sensor when the associated view was captured. The location information may include one or more of a horizontal capture angle, a vertical capture angle, and distance information. The location information may be specified relative to a fixed point such as a center of the scene. The location information may be specified in relative terms, such as relative to another sensor or an object in the scene. The views may be obtained in real-time (e.g., live video) from the sensor (e.g., camera), or via a recorded image store.

At node 404, a request for the scene is received. The request includes a viewing position. The viewing position, as discussed above, includes information identifying the location of the viewer of the requested scene. The location information may include one or more of a horizontal viewing angle, a vertical capture angle, and distance information. The location information may be specified relative to a fixed viewing point such as the center of the display. The location information may be specified in relative terms.

At node 406, one or more views of the scene are identified based on a comparison of the viewing position with the capture position of each view. For example, a query of the image store may be performed specifying the scene and the requested viewing position. In some implementations, as discussed above, multiple views may be selected. For example, if the requested viewing angle is not available, two views bounding the requested viewing angle may be identified.

At node 408, an output view is generated based on the identified views and the viewing position. The generation may include interpolating the output view when multiple views are identified. The generation may include zooming in on the identified view based on a viewing distance. In implementations where multiple views are identified, the zooming may be performed on each identified view or on the composite view.

Figure 5:
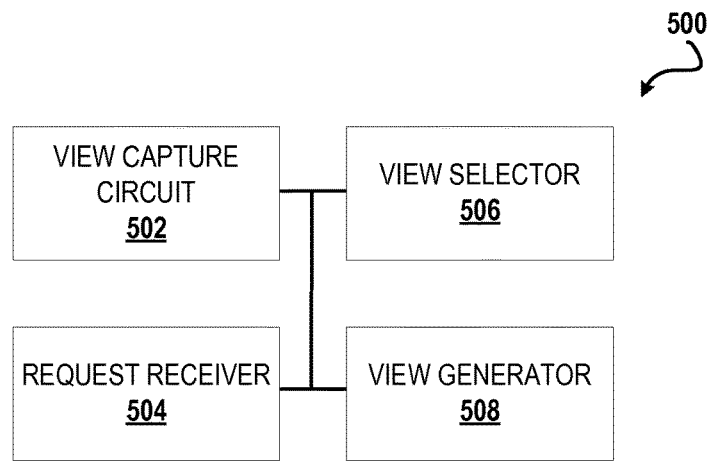
FIG. 5 illustrates a functional block diagram of a device for providing realistic video.

FIG. 5 illustrates a functional block diagram of a device for providing realistic video. Those skilled in the art will appreciate that a device for providing realistic video may have more components than the simplified device 500 shown in FIG. 5. The device 500 shown in FIG. 5 includes only those components useful for describing some prominent features of implementations with the scope of the claims. The device 500 includes a view capture circuit 502, a request receiver 504, a view selector 506, and a view generator 508.

The view capture circuit 502 is configured to obtain multiple views of a scene, each view having a capture position. The view capture circuit 502 may include one or more of a sensor, a camera, a memory, a processor, a network interface, and a transceiver. In some implementations, means for obtaining multiple views of a scene include the view capture circuit 502.

The request receiver 504 is configured to receive a request for the scene, the request including a viewing position. The request receiver 504 may include one or more of an antenna, a signal processor, a memory, a request parser, and a network interface. In some implementations, means for receiving a request for the scene include the request receiver 504.

The view selector 506 is configured to identify one or more views of the scene based on a comparison of the viewing position and the capture position of each view. The view selector 506 may include one or more of a comparator, a processor, and a memory. In some implementations, means for identifying one or more views of the scene include the view selector 506.

The view generator 508 is configured to generate an output view based on the identified views and the viewing position. The view generator 508 may include one or more of a view interpolator, an estimation unit, an encoding unit, a compression unit, a processor, and a memory. In some implementations, means for generating an output view include the view generator 508.

Figure 6:
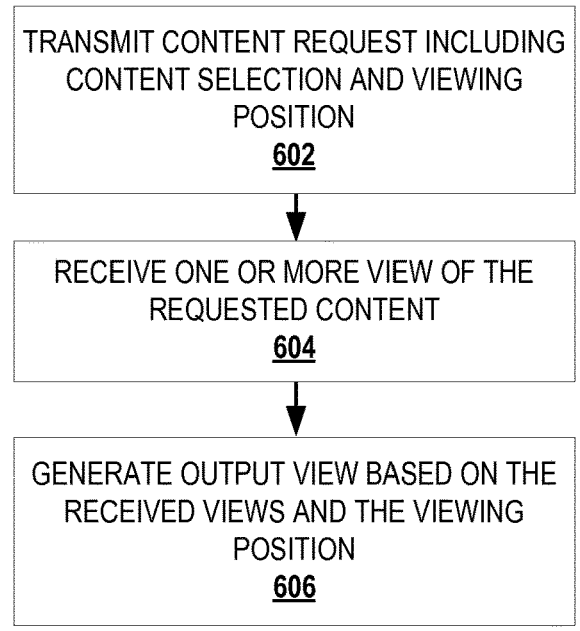
FIG. 6 illustrates a process flow diagram for an exemplary process of obtaining realistic video.

FIG. 6 illustrates a process flow diagram for an exemplary process of obtaining realistic video. The process may be implemented in whole or in part by the devices described herein. For example, the process may be implemented by/in a rendering device 114 or the device shown in FIG. 7 below.

At node 602, a content request including a content selection and a viewing position is transmitted. The content request may be transmitted to a video server. The viewing position may include at least one of a viewing angle and a viewing distance of a viewer of the selected content. In some implementations, the viewing angle may include a horizontal and/or vertical viewing angle.

At node 604, one or more view of the requested content are received. Each received view includes capture position information. The capture position information may identify a capture angle and/or distance for the view.

At node 606, an output view is generated based on the received views and the viewing position. In some implementations, this may include interpolating the output view based on two or more received views. The generating may also include zooming in on the view based on a viewing distance.

Figure 7:
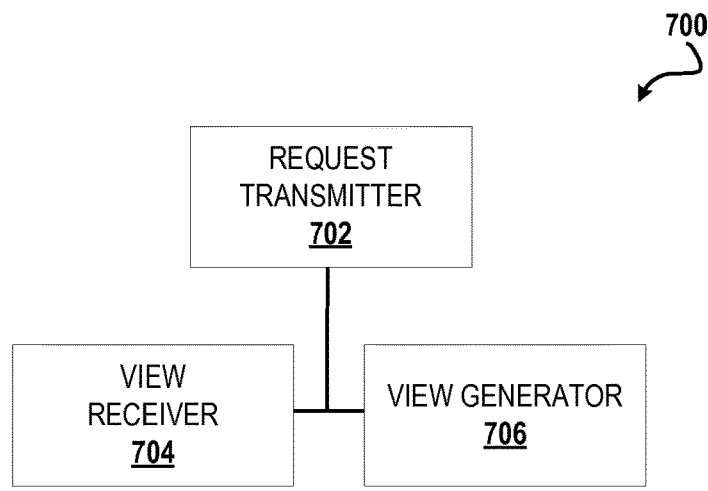
FIG. 7 illustrates a functional block diagram of a device for obtaining realistic video.

FIG. 7 illustrates a functional block diagram of a device for obtaining realistic video. Those skilled in the art will appreciate that a device for obtaining realistic video may have more components than the simplified device 700 shown in FIG. 7. The device 700 shown in FIG. 7 includes only those components useful for describing some prominent features of implementations with the scope of the claims. The device 700 includes a request transmitter 702, a view receiver 704, and a view generator 706.

The request transmitter 702 is configured to transmit a content request including a content selection and a viewing position. The request transmitter 702 may include one or more of an antenna, a transmitter, a power source, an amplifier, a processor, a signal generator, and a memory. In some implementations, means for transmitting a content request includes the request transmitter 702.

The view receiver 704 is configured to receive one or more views of the requested content. The view receiver 704 may include one or more of a receiver, an antenna, a signal processor, a network interface, a memory, and a multiplexor. In some implementations, means for receiving one or more views of the requested content includes the view receiver 704.

The view generator 706 is configured to generate an output view based on the received views and the viewing position. The view generator 706 may include one or more of a view interpolator, an estimation unit, an encoding unit, a compression unit, a processor, and a memory. In some implementations, means for generating an output view include the view generator 706.

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by an encoding device and/or decoding device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of providing video corresponding to a dynamic and arbitrary viewing position, the method comprising:

receiving, at a video server from at least one camera, image data representing multiple views of a scene, each view having a capture position identifying a capture angle and a capture distance of a camera capturing image data for the view;

receiving, at the video server from a viewing device for presenting the video, a server capability request, wherein the server capability request is received before providing image data of the scene to the viewing device;

transmitting, from the video server to the viewing device for presenting the video, in response to the server capability request, server capability information indicating that the video server can generate a video data stream corresponding to a requested viewing position;

receiving, at the video server, a request for the scene from the viewing device for presenting the video, the request including a viewing position relative to the viewing device of a viewer within a viewing area of the viewing device detected by a position detector coupled with the viewing device;

determining, by the video server, that the multiple views do not include a view associated with a capture position aligned with the viewing position;

identifying, by the video server, a first view of the multiple views of the scene and a second view of the multiple views of the scene, said identifying based on a comparison of the viewing position and the capture position of each view included in the multiple views, and wherein the first view is captured from a first capture position and the second view is captured from a second capture position, and wherein the viewing position is between the first capture position and the second capture position; and generating, by the video server, an output stream including first image data for the first view and second image data for the second view for transmission to the viewing device, wherein a three-dimensional image of the scene is formed from a combination of the first image data with the second image data.

2. The method of claim 1, wherein the viewing position includes at least one of a viewing angle and a viewing distance of the viewer relative to the viewing device within the viewing area.

3. The method of claim 1, wherein receiving image data representing multiple views of the scene comprises receiving image data for each view from a respective camera.

4. The method of claim 1, wherein receiving image data representing multiple views of the scene comprises obtaining the image data for each view from a memory.

5. The method of claim 1, further comprising periodically receiving requests for the scene, each request including a current viewing position of the viewer, and wherein the requests include the request.

6. The method of claim 5,
wherein the requests further include an initial request for the scene, and
wherein the method further comprises:
receiving, from the viewing device prior to receiving the request, the initial request for the scene, the initial request including an initial viewing position relative to the viewing device of the viewer within the viewing area of the viewing device detected by the position detector coupled with the viewing device;
identifying, by the video server, a spatial distance between the initial viewing position of the viewer and the viewing position of the viewer;
determining, by the video server, that the spatial distance corresponds to a position deviation value indicating a difference between two viewing positions for selecting new views of the scene; and
wherein the determining, by the video server, that the multiple views do not include a view associated with a capture position aligned with the viewing position is performed in response to the determining that the spatial distance corresponds to the position deviation value.

7. The method of claim 1, wherein generating the output stream comprises generating an interpolated view based on the first view and the second view.

8. The method of claim 1, further comprising:
determining a scaling amount based on a comparison of a viewing distance detected for the viewer relative to the viewing device within the viewing area with a first capture distance associated with the first view; and
scaling the first view included in the output stream based at least in part on the scaling amount.

9. The method of claim 1, further comprising:
determining a cropping amount based on a comparison of a viewing distance detected for the viewer relative to the viewing device within the viewing area with a first capture distance associated with the first view; and
cropping the first view included in the output stream based at least in part on the cropping amount.

10. The method of claim 1, the method further comprising transmitting the output stream to the viewing device.

11. A video server for providing video corresponding to a dynamic and arbitrary viewing position, the video server comprising:

a view capture circuit configured to receive image data representing multiple views of a scene from at least one camera, each view having a capture position identifying a capture angle and a capture distance of a camera capturing image data for the view;
a receiver configured to receive, from a viewing device for presenting the video, a server capability request, wherein the server capability request is received before providing image data of the scene to the viewing device;
a transmitter configured to provide, to the viewing device for presenting the video, in response to the server capability request, server capability information indicating the video server can generate a video data stream corresponding to a requested viewing position,
the receiver further configured to receive a request for the scene from the viewing device for presenting the video, the request including a viewing position relative to the viewing device of a viewer within a viewing area of the viewing device detected by a position detector coupled with the viewing device;
a view selector configured to:
determine that the multiple views do not include a view associated with a capture position aligned with the viewing position, and
identify a first view of the multiple views of the scene and a second view of the multiple views of the scene, said view selector configured to identify the first view and the second view based on a comparison of the viewing position and the capture position of each view included in the multiple views, wherein the first view is captured from a first capture position and the second view is captured from a second capture position, the received viewing position between the first capture position and the second capture position; and
a stream generator configured to generate an output stream including first image data for the first view and second image data for the second view for transmission to the viewing device, wherein a three-dimensional image of the scene is formed from a combination of the first image data with the second image data.

12. The video server of claim 11, wherein the viewing position includes at least one of a viewing angle and a viewing distance of the viewer relative to the viewing device within the viewing area of the video.

13. The video server of claim 11, wherein the view capture circuit is configured to receive image data representing each of the multiple views of the scene from a respective camera.

14. The video server of claim 11, wherein the view capture circuit is configured to receive image data representing each of the multiple views of the scene from a memory.

15. The video server of claim 11, wherein the receiver is configured to periodically receive requests for the scene, each request including a viewing position.

16. The video server of claim 11, wherein the view selector is configured to identify the first view and the second view based on a substantial alignment of respective capture positions for the first view and the second view with the received viewing position.

17. The video server of claim 11, wherein the stream generator is configured to generate an interpolated view based on the first view and the second view.

18. The video server of claim 11, wherein the stream generator is configured to:

determine a scaling amount based on a comparison of a viewing distance detected for the viewer relative to the viewing device within the viewing area with a first capture distance associated with the first view; and scale the first view included in the output stream based at least in part on the scaling amount.

19. The video server of claim 11, wherein the stream generator is configured to:

determine a cropping amount based on a comparison of a viewing distance detected for the viewer relative to the viewing device within the viewing area with a first capture distance associated with the first view; and crop the first view included in the output stream based at least in part on the cropping amount.

20. The video server of claim 11, wherein the transmitter is further configured to transmit the output stream to the viewing device.

21. A video serving device for providing video corresponding to a dynamic and arbitrary viewing position, the video serving device comprising:

means for receiving image data representing multiple views of a scene, each view having a capture position identifying a capture angle and a capture distance of a camera capturing image data for the view;

means for receiving, from a viewing device for presenting the video, a server capability request, wherein the server capability request is received before providing image data of the scene to the viewing device;

means for transmitting, to the viewing device for presenting the video, in response to the server capability request, server capability information indicating that the video serving device can generate a video data stream corresponding to a requested viewing position;

means for receiving a request for the scene from the viewing device for presenting the video, the request including a viewing position relative to the viewing device of a viewer within a viewing area of the viewing device detected by a position detector coupled with the viewing device;

means for determining that the multiple views do not include a view associated with a capture position aligned with the viewing position and for identifying a first view of the multiple views of the scene and a second view of the multiple views of the scene, said identifying based on a comparison of the viewing position and the capture position of each view included in the multiple views, and wherein the first view is captured from a first capture position and the second view is captured from a second capture position, and wherein the received viewing position is between the first capture position and the second capture position; and means for generating an output stream including first image data for the first view and second image data for the second view for transmission to the viewing device, wherein a three-dimensional image of the scene is formed from a combination of the first image data with the second image data.

22. A non-transitory computer-readable storage medium comprising instructions executable by a processor of a video serving device, the instructions causing the video serving device to:

receive image data representing multiple views of a scene, each view having a capture position identifying a capture angle and a capture distance of a camera capturing image data for the view;

receive, from a viewing device for presenting the video, a server capability request, wherein the server capability request is received before providing image data of the scene to the viewing device;

transmit, to the viewing device for presenting the video, server capability information indicating that the video server can generate a video data stream corresponding to a requested viewing position;

receive a request for the scene from the viewing device for presenting the video, the request including a viewing position relative to the viewing device of a viewer within a viewing area of the viewing device detected by a position detector coupled with the viewing device;

determine, by the video server, that the multiple views do not include a view associated with a capture position aligned with the viewing position;

identify a first view of the multiple views of the scene and a second view of the multiple views of the scene, said identifying based on a comparison of the viewing position and the capture position of each view included in the multiple views, and wherein the first view is captured from a first capture position and the second view is captured from a second capture position, and wherein the received viewing position is between the first capture position and the second capture position; and generate an output stream including first image data for the first view and second image data for the second view for transmission to the viewing device, wherein a three-dimensional image of the scene is formed from a combination of the first image data with the second image data.

23. A method of obtaining video corresponding to a dynamic and arbitrary viewing position, the method comprising:

receiving a first content selection for a first scene;

determining that the first content selection is provided by a first video server that cannot generate a video data stream corresponding to a requested viewing position based at least in part on first server capability information for the first video server;

transmitting a first content request including the first content selection to the first video server;

receiving, from the first video server, image data for one view of the first scene at a default viewing position of the first video server, wherein the image data is received by the first video server from a first camera;

generating a first output image of the first scene based on the image data for the one view;

receiving a second content selection of a second scene;

determining that the second content selection is provided by a second video server configured to generate video data streams corresponding to a requested viewing position based at least in part on second server capability information for the second video server;

detecting, in response to determining that the second content selection is provided by the second video server configured to generate video data streams corresponding to a requested viewing position, a viewing position of a viewer within a viewing area for the second content selection;

transmitting a second content request including the second content selection and the viewing position to the second video server;

receiving, from the second video server, image data for multiple views of the second scene, said image data including, for each of the multiple views, a capture angle and a capture distance of a camera capturing the image data; and generating a three-dimensional image of the second scene for the viewer based on the image data received for at least two of the multiple views and the viewing position.

24. The method of claim 23, wherein the viewing position includes at least one of a viewing angle and a viewing distance of the viewer of the second content selection.

25. The method of claim 24, wherein the viewing angle includes at least one of a horizontal viewing and a vertical viewing angle.

26. The method of claim 23, wherein detecting the viewing position comprises:
receiving sensor data from a sensor; and
determining the viewing position based at least in part on the received sensor data.

27. The method of claim 26, wherein the sensor comprises at least one of a photodetector, a light source, a gyroscope, and an antenna.

28. The method of claim 26, wherein the sensor comprises an image capture device.

29. The method of claim 28, wherein determining the viewing position comprises:
identifying an object in an image obtained by the image capture device, wherein the object includes one of a facial attribute, a furnishing, a décor item, and an electronic device; and
determining the viewing position based on a characteristic of the identified object, wherein the characteristic includes at least one of a color, a position, and a reflection.

30. The method of claim 23, wherein the second content request is transmitted to a video server.

31. The method of claim 23, wherein receiving the image data comprises receiving image data for a first view having a first capture position and image data for a second view having a second capture position, the viewing position between the first capture position and the second capture position.

32. The method of claim 31, wherein generating the three-dimensional image comprises generating an interpolated image based on the image data for the first view and the image data for the second view.

33. The method of claim 23, wherein generating the three-dimensional image comprises at least one of:
scaling the three-dimensional image based at least in part on the viewing position; and
cropping the three-dimensional image based at least in part on the viewing position.

34. The method of claim 23, wherein generating the first output image comprises:
detecting another viewing position of the viewer within the viewing area for the first content selection; and
at least one of:
cropping the first output image based at least in part on the another viewing position; and
scaling the first output image based at least in part on the another viewing position.

35. A device for obtaining video corresponding to a dynamic and arbitrary viewing position, the device comprising:
a processor configured to:
receive a first content selection for a first scene;
determine that the first content selection is provided by a first video server that cannot generate a video data stream corresponding to a requested viewing position based at least in part on first server capability information for the first video server;
transmit a first content request including the first content selection to the first video server;
receive, from the first video server, image data for one view of the first scene at a default viewing position of the first video server, wherein the image data is received by the first video server from a first camera;
generate a first output image of the first scene based on the image data for the one view;
receive a second content selection for a second scene;
determine that the second content selection is provided by a second video server configured to generate a video data stream corresponding to a requested viewing position based at least in part on second server capability information for the second video server;
detect, in response to determining that the second content selection is provided by the second video server configured to generate a video data stream corresponding to a requested viewing position, a viewing position of a viewer within a viewing area for the second content selection;
transmit a second content request including the second content selection and the viewing position of the viewer to the second video server;
receive, from the second video server, image data for multiple views of the second scene, said image data including, for each of the multiple views, a capture angle and a capture distance of a camera capturing the image data; and
generate a three-dimensional image of the second scene for the viewer based on the image data received for at least two of the multiple views and the viewing position.

36. The device of claim 35, wherein the viewing position includes at least one of a viewing angle and a viewing distance of a viewer of the second content selection.

37. The device of claim 36, wherein the viewing angle includes at least one of a horizontal viewing and a vertical viewing angle.

38. The device of claim 35, further comprising a sensor in data communication with the processor, wherein the processor is configured to detect the viewing position based at least in part on data received from the sensor.

39. The device of claim 38, wherein the sensor comprises at least one of a photodetector, a light source, a gyroscope, and an antenna.

40. The device of claim 38, wherein the sensor comprises an image capture device.

41. The device of claim 40, wherein the processor is configured to:
identify an object in an image obtained by the image capture device, wherein the object includes one of a facial attribute, a furnishing, a décor item, and an electronic device; and
detect the viewing position based on a characteristic of the identified object, wherein the characteristic includes at least one of a color, a position, and a reflection.

42. The device of claim 35, wherein the second content request is transmitted to a video server.

43. The device of claim 35, wherein the image data comprises image data for a first view having a first capture position and image data for a second view having a second capture position, the viewing position being between the first capture position and the second capture position.

44. The device of claim 43, wherein the three-dimensional image is an interpolated image based on the image data for the first view and the image data for the second view.

45. The device of claim 35, wherein the processor is further configured to scale or crop the three-dimensional image based at least in part on the viewing position.

46. The device of claim 35, wherein the processor is further configured to:
detect another viewing position of the viewer within the viewing area for the first content selection; and
scale or crop the first output image based at least in part on the another viewing position.

47. A device for obtaining video corresponding to a dynamic and arbitrary viewing position, the device comprising:
means for receiving a first content selection for a first scene and a second content selection for a second scene;
means for determining that the first content selection is provided by a first video server that cannot generate a video data stream corresponding to a requested viewing position based at least in part on first server capability information for the first video server and that the second content selection is provided by a second video server configured to generate video data streams corresponding to a requested viewing position based at least in part on second server capability information for the second video server;
means for detecting, in response to determining that the second content selection is provided by the second video server configured to generate video data streams corresponding to a requested viewing position, a viewing position of a viewer within a viewing area for the second content selection;
means for transmitting a first content request including the first content selection to the first video server and a second content request including the second content selection and the viewing position of the viewer to the second video server;
means for receiving:
(i) from the first video server, image data for one view of the first scene at a default viewing position of the first video server, wherein the image data is received by the first video server from a first camera, and
(ii) from the second video server, image data for multiple views of the second scene, said image data for multiple views including, for each view, a capture angle and a capture distance of a camera capturing the image data; and
means for generating a first output image of the first scene based on the image data for the one view and a three-dimensional image for the viewer based on the image data received for at least two of the multiple views and the viewing position.

48. A non-transitory computer-readable storage medium comprising instructions executable by a processor of a device, the instructions causing the device to:
receive a first content selection for a first scene;
determine that the first content selection is provided by a first video server that cannot generate a video data stream corresponding to a requested viewing position based at least in part on first server capability information for the first video server;
transmit a first content request including the first content selection to the first video server;
receive, from the first video server, image data for one view of the first scene at a default viewing position of the first video server, wherein the image data is received by the first video server from a first camera;
generate a first output image of the requested first content selection based on the image data for the one view;
receive a second content selection for a second scene;
determine that the second content selection is provided by a second video server configured to generate video data streams corresponding to a requested viewing position based at least in part on second server capability information for the second video server;
detect, in response to determining that the second content selection is provided by the second video server configured to generate video data streams corresponding to a requested viewing position, a viewing position of a viewer within a viewing area for the second content selection;
transmit a second content request including the second content selection and the viewing position of the viewer to the second video server;
receive, from the second video server, image data for multiple views of the second scene, said image data including, for each of the multiple views, a capture angle and a capture distance of a camera capturing the image data; and
generate a three-dimensional image for the viewer based on the image data received for at least two of the multiple views and the viewing position.

49. The method of claim 1, wherein the viewing position identifies a location of the viewer within the viewing area of the viewing device relative to a location on the viewing device.

50. The method of claim 49, wherein the location on the viewing device is a center point on a display surface of the viewing device configured to present the video.

51. The device of claim 35, wherein the processor is further configured to:
determine a hardware characteristic of the device, wherein the hardware characteristic includes one of: a processor load for the device, battery power level for the device, network bandwidth for the device, or network connectivity type for the device;
generate a reselection time based on the hardware characteristic of the device, wherein the reselection time identifies a future time for transmitting a third content request for updated image data for the second content selection to the second video server; and
upon occurrence of the reselection time,
detect a second viewing position of the viewer within the viewing area for the second content selection, wherein the second viewing position is detected at a time after the viewing position was detected, wherein the time is identified by the reselection time; and
transmit the third content request including the second content selection and the second viewing position of the viewer to the second video server.

52. The device of claim 35, wherein the processor is further configured to:
determine a level for a hardware resource of the device for obtaining the video, wherein the hardware resource includes one of: a processor load for the device, battery power level for the device, network bandwidth for the device, or network connectivity type for the device;
identify an amount of viewing position information to include in the second content request using the level for the hardware resource, the viewing position information identifying the viewing position; and provide the amount of viewing position information to the second video server via the second content request.

* * * * *